United States Patent

Wass

[11] Patent Number: 5,570,897
[45] Date of Patent: Nov. 5, 1996

[54] PORTABLE QUICK HITCHING DEVICE

[76] Inventor: Lloyd G. Wass, 1670 Blackhawk Cove, Eagan, Minn. 55122

[21] Appl. No.: 360,607

[22] Filed: Dec. 21, 1994

[51] Int. Cl.[6] ..................................................... B60D 1/52
[52] U.S. Cl. ........................ 280/495; 280/491.5; 280/511
[58] Field of Search ............................. 280/491.1, 491.5, 280/495, 504, 511, 515, 415.1, 416.1, 416.2

[56] References Cited

U.S. PATENT DOCUMENTS

| | | | |
|---|---|---|---|
| 2,633,067 | 3/1953 | Cruse et al. | 97/50 |
| 3,031,208 | 4/1962 | Abbott | 280/460 |
| 3,220,751 | 11/1965 | Tweedale | 280/461 |
| 3,498,638 | 3/1970 | Magruder | 280/479 |
| 4,037,681 | 7/1977 | Gorby | 280/495 X |
| 4,047,734 | 9/1977 | Miles | 280/495 X |
| 4,336,954 | 6/1982 | Orvis | 280/415 R |

OTHER PUBLICATIONS

*Successful Farming*, "All Around the Farm", p. 72, Oct. 1993.

*Primary Examiner*—Kevin T. Hurley
*Attorney, Agent, or Firm*—Kinney & Lange

[57] ABSTRACT

A portable quick hitching device connects to a vehicle equipped with a bucket or other attached implement. The base of the device is constructed so as to engage the lip of the bucket and to support a towing ball or wagon hitch pin. A brace attached to an opposing side of the bucket secures the base to the bucket.

20 Claims, 5 Drawing Sheets

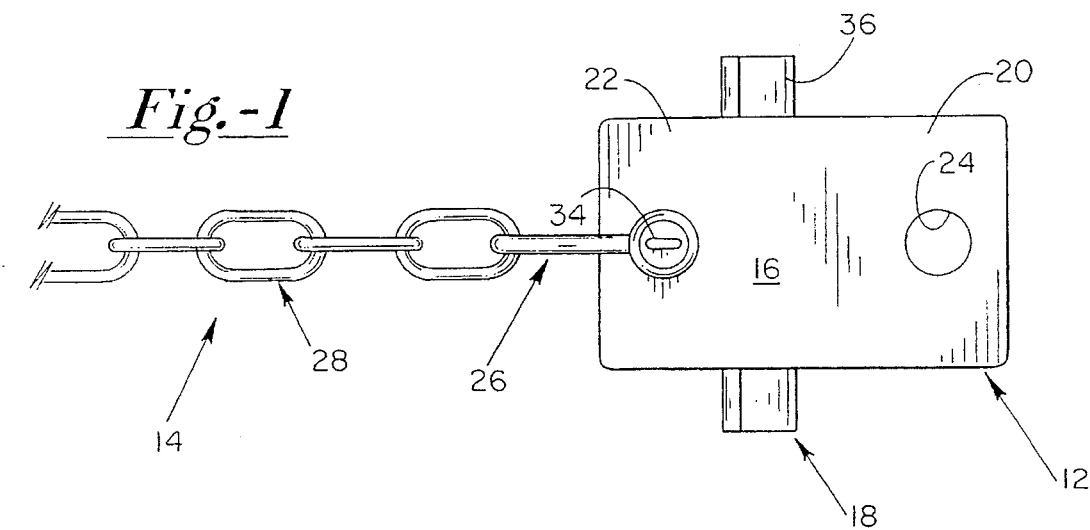
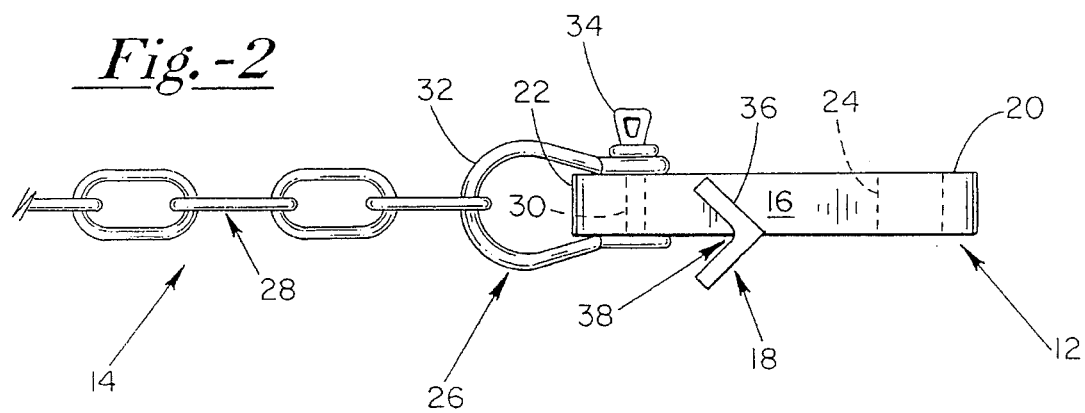
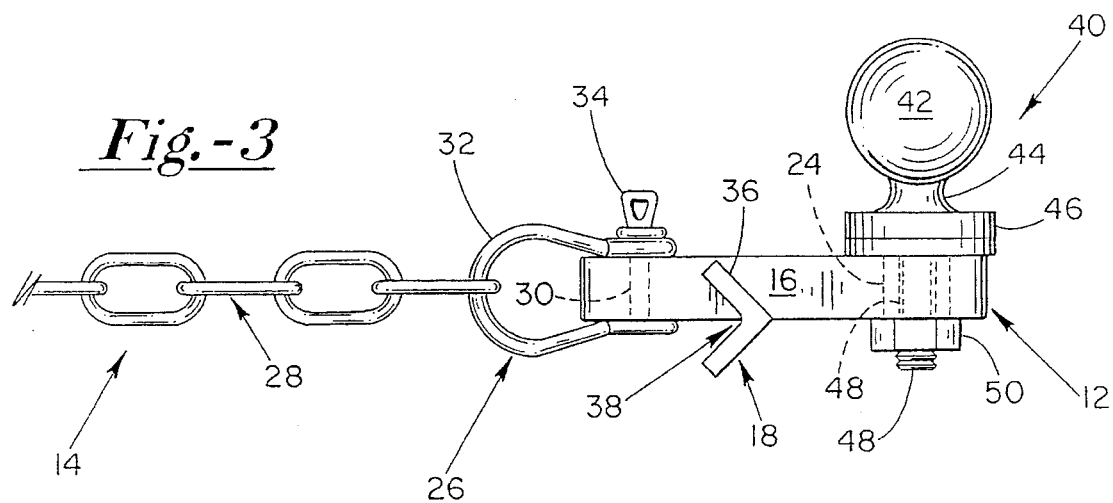

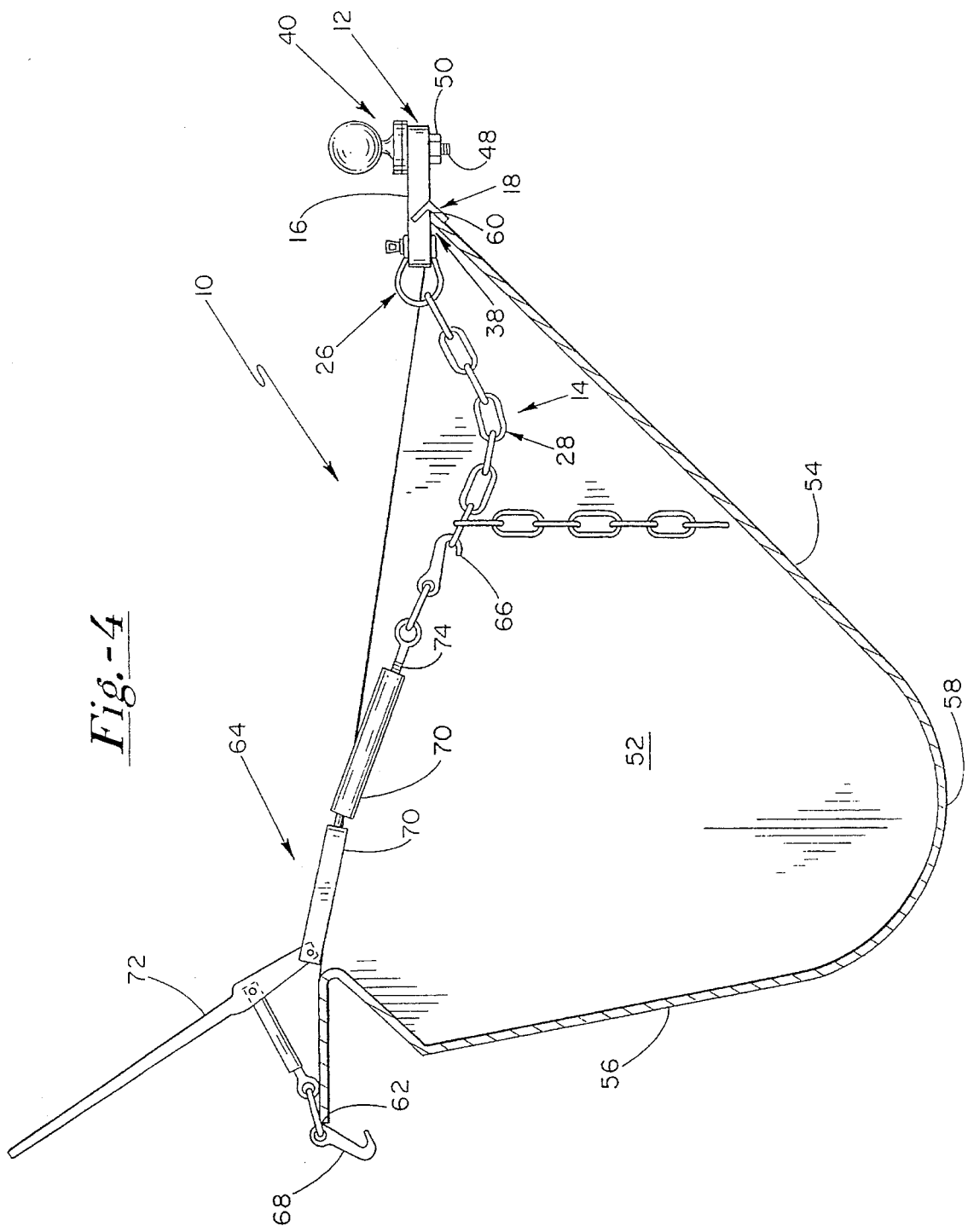

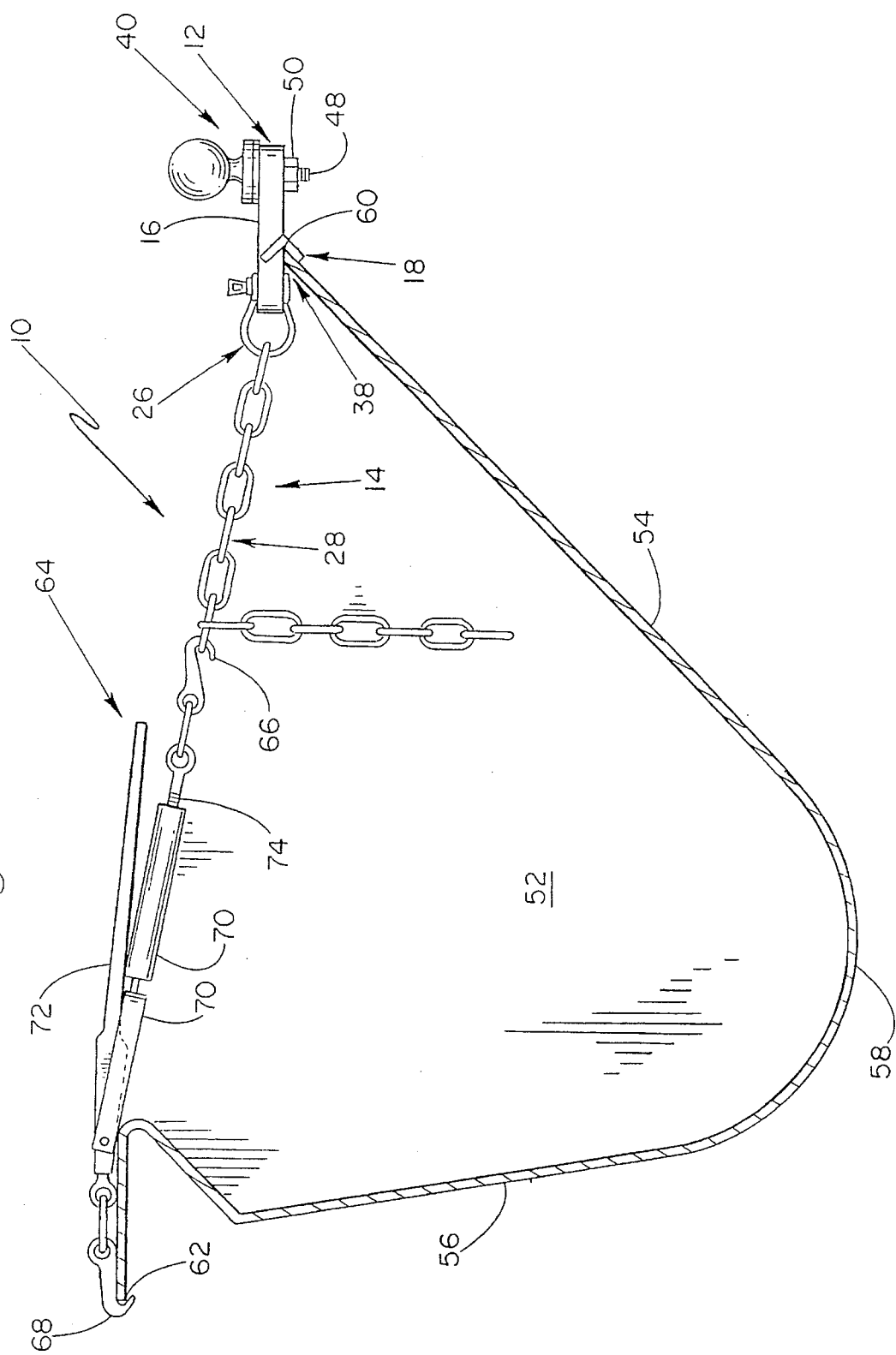

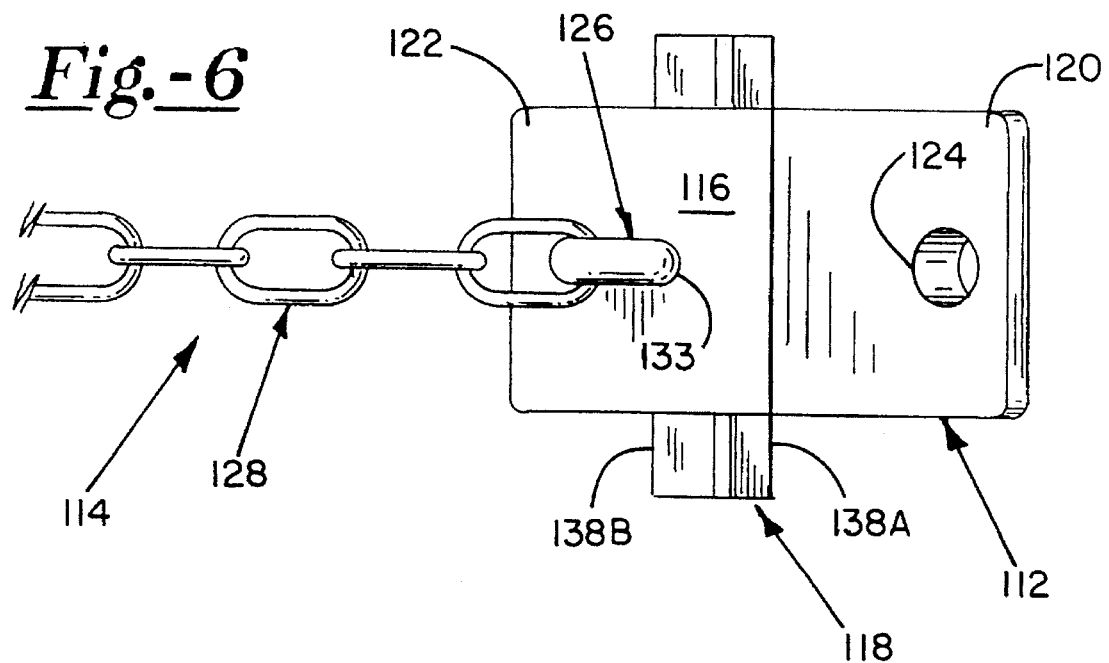
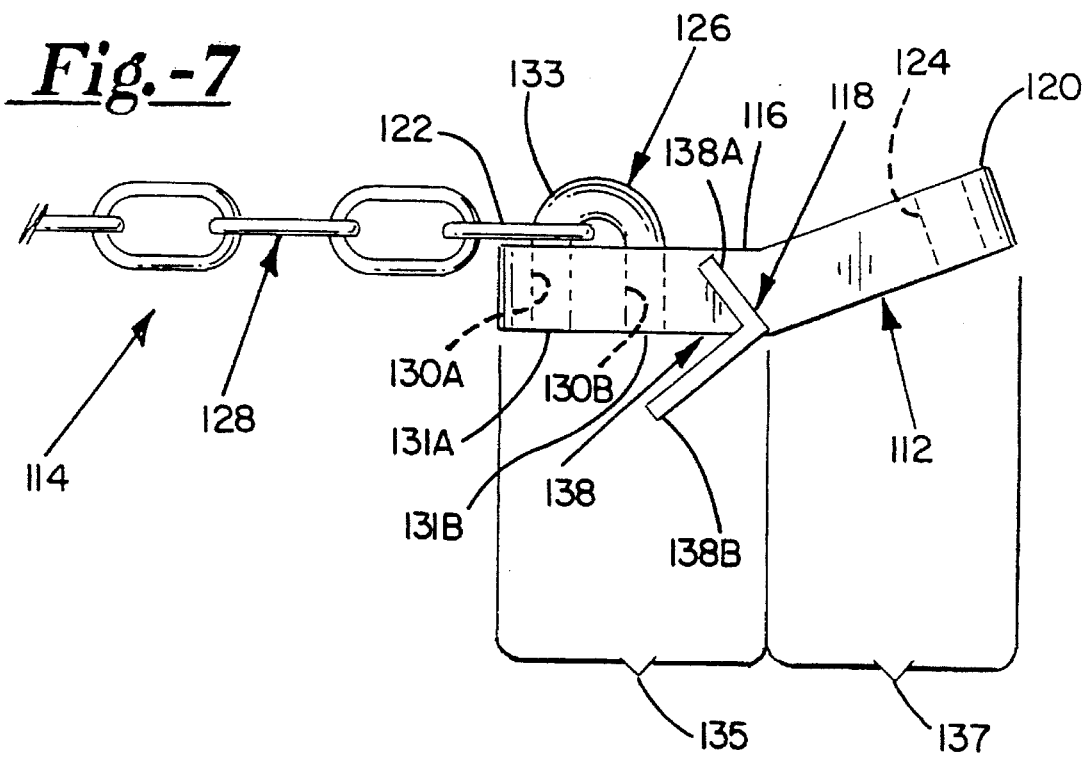

5,570,897

PORTABLE QUICK HITCHING DEVICE

BACKGROUND OF THE INVENTION

This invention targets a group of specialty tractors that include "skid steer" 4-wheel-drive fixed axle tractors such as "Bobcats" that are typically factory-outfitted with front loader "dirt buckets", conventional farm tractors that are optionally equipped with front loader buckets, and the larger articulated 4-wheel-drive gravel bucket loaders such as "Payloaders". These specialty machines are often used at construction sites and for various tasks on farms and ranches. One increasingly common use is for moving trailers and wagons around farm yards and construction sites.

Of this group of machines, the typically smaller "skid steer" tractors that have the unique capability of "spot" turning by independently reversing direction of their left or right drive wheels are by far the most maneuverable and, as a result, the most popular for trailer and wagon moving. In this scenario, trailers and wagons are normally connected in some manner to a bolt hole located centrally in the forward or "lip" section of the tractors' bucket, thus enabling a connected trailer to be either "pulled" or "backed" with relative ease. It should also be noted that it is relatively easy to "back" 4-wheeled wagons connected to a skid steer tractor in this manner—a feat that is normally considered to be very difficult with any rear hitch configuration.

There are, however, two problems commonly encountered when moving trailers with these tractors. First, most loader buckets manufactured before the early 1990's were not made with bolt holes in the hardened steel bucket lip. It is usually not possible to drill a hole in the heat treated bucket lip with readily available drills. A gas cutting torch can be used to burn a hole in the bucket lip, but it can be difficult to obtain a good quality hole suitable for secure fastening of a trailer towing ball. Further, the torch heat may reduce the temper of the surrounding steel, making this area vulnerable to subsequent stress, cracking and premature failure.

Second, even when a factory hole is supplied with the bucket, it is often not practical to leave a trailer towing ball permanently installed on the bucket as the ball interferes with most normal uses for such a loader. Hence, when used frequently, it can become a time consuming and frustrating exercise to install and remove towing balls affixed via a conventional bolt.

SUMMARY OF THE INVENTION

The invention is a portable hitching device designed to connect to vehicles that have a bucket loader such as utility vehicles, construction vehicles and farm vehicles including tractors. The hitching device consists of a base (a modified draw bar) configured to engage a bucket or other implement attached to a vehicle. The base provides on one end an aperture to support a towing ball or wagon hitch pin and on the other end an attachment to a brace.

In one embodiment, the base consists of a flat rectangular steel plate. A piece of angle iron is welded across the face of the base, straddling the mid-section and creating a v-channel that conforms to the lip of the bucket. On one end, the base provides a hole through which the threaded shaft of a towing ball or a wagon hitch pin may be inserted. On the other end the base provides a hole for a chain coupling which connects a chain to the base. An adjustable chain binder is attached to the chain and to the back edge of the bucket opposite the front or lip edge on which the base is engaged. When the binder is in its open position the chain is loose and the base is loosely engaged to the bucket lip. When the binder is in its closed position, the chain is taut and the base is securely engaged to the bucket lip so that it can support the load of a trailer.

In another embodiment, the base is bent. This bend orients the ball on the bucket lip at a different angle in reference to the bucket than the flat plate, straight base embodiment. Depending upon the bucket and the trailer to be towed, various angles in the base instead of a straight base may be provided for easier towing.

BRIEF DESCRIPTION OF THE DRAWINGS

FIG. 1 is a top view of the base and chain assembly of the hitching device showing the bolt hole on one end of the base and the chain coupling on the other end;

FIG. 2 is a side view of the base, the angle iron which forms a v-channel for engaging the bucket (not shown), and the chain of the hitching device;

FIG. 3 is a side view of the base of the hitching device with a towing bail connected through the aperture of the base.

FIG. 4 is a cut-away view of a bucket of a vehicle with the hitching device loosely engaged to the bucket, and with the chain binder of the hitching device attached to the chain and to the opposite side of the bucket from the base, and with the binder in the open position;

FIG. 5 is a cut-away view of a bucket of a vehicle with the hitching device tightly engaged to the bucket, and with the chain binder in the closed position.

FIG. 6 is a top view of an alternative embodiment of the base that is attached to the chain assembly.

FIG. 7 is a side view of the alternative embodiment as disclosed in FIG. 6.

DETAILED DESCRIPTION OF THE PREFERRED EMBODIMENTS

Figure 8:
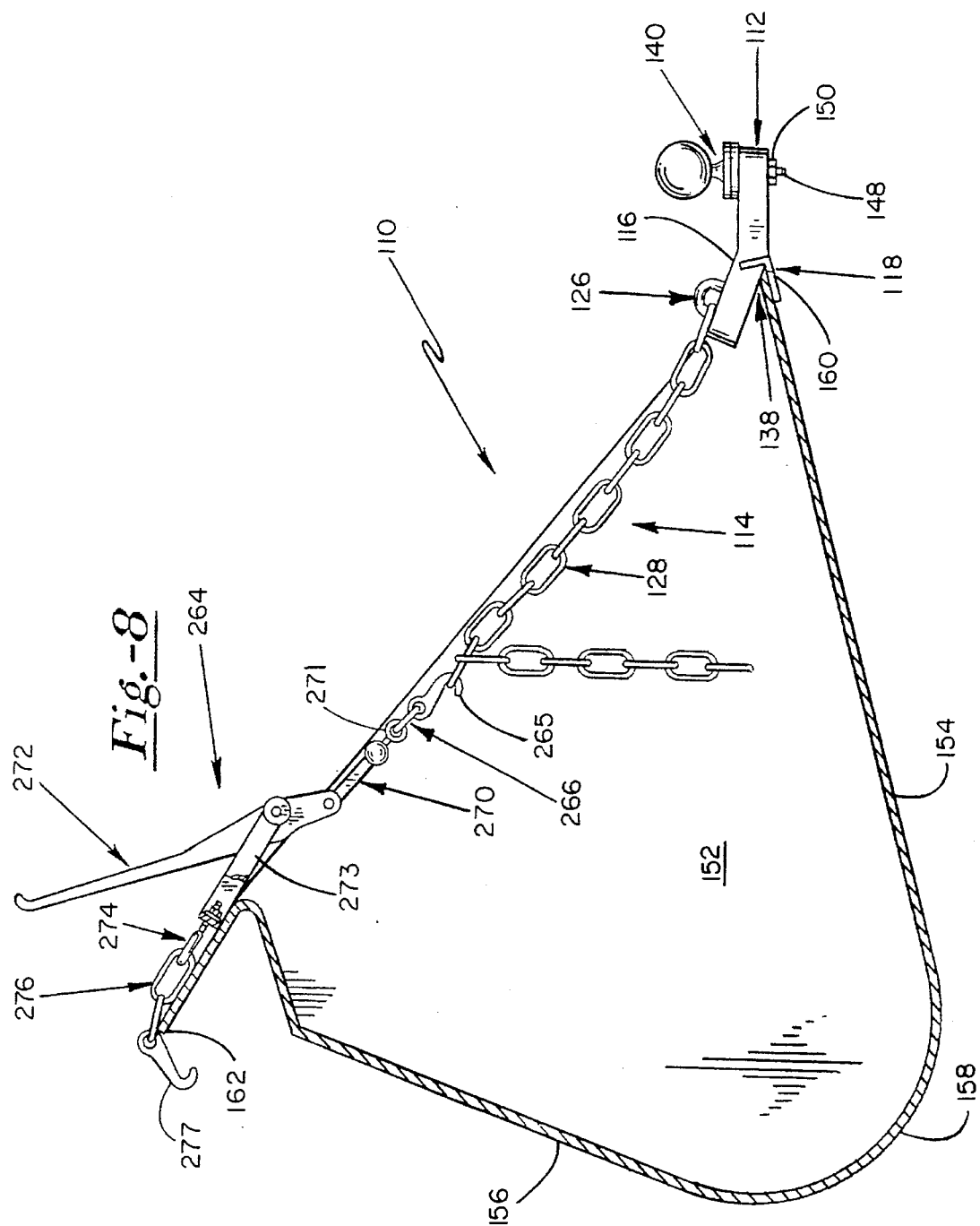
FIG. 8 is a cut-away view of a bucket of a vehicle with the alternative embodiment of the base (as shown in FIGS. 6–7) and an alternative embodiment of the chain binder disclosed.

FIG. 1 shows a base 12 and a chain assembly 14 of a hitching device 10 (shown in full in FIGS. 4 and 5). Base 12 consists of a flat rectangular steel plate 16 and an angle iron 18. Chain assembly 14 includes a chain coupling 26 and a chain 28. Steel plate 16 has a first end 20 which contains an aperture 24 sized to fit a wagon hitch pin or a threaded shaft of a towing ball bolt (shown in FIG. 3). Steel plate 16 has a second end 22 which is configured to receive chain assembly 14, specifically chain coupling 26. The structure of base 12 enables it to engage a bucket via angle iron 18 and to establish a secure connection to the bucket via chain assembly 14. This secure connection, in turn, enables base 12 to support the load of a trailer (not shown). The dimensions of steel plate 16 and the gauge of chain 28 must be sufficient to support the anticipated load of the trailer. The length of angle iron 18 exceeds the width of steel plate 16. FIG. 2 shows how angle iron 18 is cut to straddle steel plate 16. It is then welded on three sides to form a permanent bond between angle iron 18 and steel plate 16.

FIG. 2 shows a side view of base 12 and chain assembly 14. First end 20 of steel plate 16 contains aperture 24; second end 22 of steel plate 16 contains a hole 30. Chain coupling 26 consists of a ring 32 and a fastener having a wing nut 34 and a screw (hidden) which fits through hole 30. Angle iron 18 has a top portion 36 which is attached to steel plate 16. The intersection of steel plate 16 and angle iron 18 forms a v-channel 38.

Resulting v-channel 38 fits over a lip of a commercially available bucket to engage base 12 and v-channel 38 to the bucket. Chain coupling ring 32 connects to chain 28 and hole 30 of steel plate 16. Wing nut 34 tightens ring 32 to steel plate 16. Chain 28 is thus securely attached to base 12 to facilitate the forming of a secure connection to a bucket (see FIG. 5).

The use of chain coupling 26 enables chain 28 to be detached from base 12 quickly and easily, making it more convenient for disassembly and transport of portable hitching device 10. Further, chain 26 may be used for other purposes when not attached to base 12. However, it would be possible to form a permanent attachment between base 12 and chain 26 by welding them together as shown in FIGS. 6–8 and discussed later. Other means of attaching chain 26 to base 12 are also available.

By using angle iron 18, the intersection between steel plate 16 and angle iron 18 forms groove 38 which conforms to the shape of lip of a bucket. However, other shapes for a groove may be required or used depending on the particular characteristics of the bucket lip. In this case, a different form may be welded to a steel plate to form an arm which together with the steel plate creates a groove conforming to the required shape. Alternatively, the base may consist of a modified steel plate machined with a groove having the required shape.

FIG. 3 shows base 12 with a ball 40 which includes a spherical portion 42, a neck portion 44, a base portion 46, and a threaded shaft 48. Ball 40 fits through aperture 24 of steel plate 16 via threaded shaft 48. Nut 50 threads onto threaded shaft 48 and sandwiches steel plate 16 between base portion 46 and nut 50. Ball 40 enables hitching device 10 to connect to a standard trailer (not shown).

Base 12 provides the functionality conventionally attributed to a draw bar attached to the rear of a vehicle. Workers skilled in the art will recognize that mounts other than base 12 can be used with this invention to support a connection, such as a towing ball or a wagon hitch pin, to a trailer. While the connection may be supported via hole 24 in base 12 as described in this preferred embodiment, it is also possible to weld a towing ball or wagon hitch pin to the mount, thereby forming a more permanent connection. Other means of supplying a connection on base 12 are also available.

The mount should incorporate structure enabling it to be set in place such that it securely engages a bucket or other frame when an attached brace is tightened. However, the location on the mount of the connection to the trailer can be varied from that shown in FIG. 1; the connection need not have any particular orientation with respect to a groove in the mount or the attachment to the brace. Likewise, the locations of the groove and the attachment to the brace can be altered to suit particular requirements of an implementation. Further, a variety of materials may be used for the mount including a steel plate and an angle iron. The choice of materials, however, must account for an anticipated load from the trailer and from the brace acting together with the bucket.

FIG. 4 presents a side-sectional view of a bucket 52 to which hitching device 10 is attached in a loosely engaged position. Bucket 52 includes a first side 54 and a second side 56, a curved base 58 in between the first and second sides, a front lip 60 and a back edge 62. The bucket as shown in FIG. 4 is in loaded, material carrying position where first side 54 is in a front side position and second side 56 is in a back side position. The bucket is rotatable to a loading position and then to an unloading position. The loading position, as is shown in FIG. 8, is for loading material into the bucket using the front lip where the first side is approximately horizontal to the ground. When the bucket is in a loading position, the first side 54 is in a bottom side position and the second side 56 is in a top side position. If the operator continued to rotate the bucket, the bucket would move into the unloading position where the from lip 60 is facing the ground. Typically, the bucket is in either the loaded, material carrying position or the loading position, or somewhere in between, when the bucket is used to move trailers or wagons.

FIG. 4 shows hitching device 10, which includes base 12, chain assembly 14, and a chain binder 64, attached to bucket 52. Chain binder 64 includes a first hook 65, a first attachment chain 66, a first adjustment screw 67 with an eyelet 68, a binder body 69 with a first screw receiver 70 attached to a U-shaped handle receiver 71, a handle 72, a second screw receiver 73, a second adjustment screw 74 with an eyelet 75, a second attachment chain 76, and a second hook 77.

Handle 72 has a handle portion 80 and a U-shaped portion 82. U-shaped portion 82 is for receiving second adjustment screw 73 when chain binder 64 is rotated to a closed position. Similarly, U-shaped handle receiver 71 is for receiving handle 72 when chain binder 64 is rotated to a closed position.

The chain assembly 14 may be adjusted by attaching hook 65 to different links on chain 28, however this is not a fine adjustment mechanism and smaller incremental adjustments may be needed. Each of the adjustment screws 67 and 74 allow for minor adjustments to better facilitate tightening when chain binder 64 is rotated into a closed position since a secure snug fit of the hitching device is required.

V-channel 38, comprising the intersection of the angle iron 18 and steel plate 16, fits over lip 60 of bucket 52. Chain coupling 26, inserted through hole 30 of steel plate 16 connects to chain 28. First hook 65 of chain binder 64 connects to chain 28. Chain binder 64 and chain assembly 26 provide a brace to secure base 12 to first side 54 of bucket 52. Second hook 77 of chain binder 64 fits over edge 62 of bucket 52. When chain binder handle 72 is rotated to an open position, chain 28 hangs loosely and base 12 loosely engages lip 60 of bucket 52.

FIG. 4 highlights the portability of the present invention. Hitching device 10 is positioned over bucket 52 with three loose engagement points: 1) v-channel 38 and lip 60; 2) chain 28 and first hook 65; and, 3) second hook 77 and edge 62. These three engagement points facilitate quick positioning and removal of hitching device 10.

The portable nature of the invention suggests its use on other types of implements or frames that may be attached to a vehicle. Such an attached implement must have a first side and a second side opposing the first side. A mount may be designed with a groove that fits over an edge of the first side such that the mount is constrained from moving toward the second side. The orientation of these sides with respect to the vehicle is not significant. For example, in the preferred embodiment the back side of the bucket normally would be positioned toward the vehicle with the front side away from the vehicle. However, the invention does not require this orientation; it applies equally well when the positions of the sides are reversed. However, the brace, in securing the mount to the first side of the attached implement, should provide sufficient force to enable the mount to support the load of the trailer. Likewise, the sides of the implement must be sufficiently strong to bear the load of the trailer and of the brace.

FIG. 5 presents a side-sectional view of bucket 52 with the hitching device in a securely engaged position. In FIG. 5, chain binder handle 72 is rotated to a closed position. When switching from the open position to the closed position, chain binder body 69 contracts in length as U-shaped handle receiver 71 receives U-shaped handle portion 82 and as U-shaped handle portion 82 receives second screw receiver 73. As a result, chain 28 is now securely attached to first hook 65 and is taut across bucket 52. Adjustment screws 67 and 74 modify the length of body 69 such that the tension established when chain binder handle is in the closed position is sufficient to secure base 12 to first side 54.

Base 12 is now securely engaged to lip 60 of bucket 52. Second hook 77 of chain binder 64 is likewise securely engaged to edge 62 of bucket 52. In this securely engaged position, hitching device 10 provides a stable base 12 so that towing ball 40, when attached via nut 50, can support the load of a trailer (not shown).

Alternative implementations for a brace may be used with the present invention. For instance, an adjustable chain binder may be replaced by a chain tightening device that consists of a threaded shaft enclosed within a covering cylinder (not shown). Essentially, such a device operates as a large adjustment screw: the cylinder rotates in one direction to tighten the device and in the opposite direction to loosen the device. Depending upon the distance between a first side and a second side of an attached implement, it may not be necessary to use a chain at all. The chain binder may extend from a mount on the first side to the second side. For lighter trailers, it may be possible to use materials other than a steel chain for connecting the mount to the second side of the attached implement.

An alternative embodiment of a base is shown in FIGS. 6–8 as base 112. FIG. 6 shows base 112 connected to a chain assembly 114. Base 112 consists of a bent rectangular plate 116 and an angle iron 118. Chain assembly 114 includes a chain coupling 126 and a chain 128. Plate 116 has a first end 120 which contains an aperture 124 sized to fit a wagon hitch pin or a threaded shaft of a towing ball bolt as previously disclosed in FIG. 3. Plate 116 also has a second end 122 which is configured to receive chain coupling 126.

The length of angle iron 118 exceeds the width of plate 116. Angle iron 118 is cut to straddle plate 116. The angle iron is then welded on three sides to form a permanent bond between angle iron 118 and plate 116.

FIG. 7 shows a side view of base 112 and chain assembly 114. First end 120 of plate 116 contains aperture 124; while second end 122 of plate 116 contains first and second holes 130A and 130B. Typically, holes 130A and 130B are drilled substantially through the second end 122 of plate 116. Holes 130A and 130B are sufficiently apart for receiving opposing ends 131A and 131B of link 133. Ends 131A and 131B are then fastened into holes 130A and 130B such that link 133 is rigidly and permanently attached to plate 116. The fastening of ends 131A and 131B may be done by any standard means of connection known in the art, such as welding.

Chain coupling 126 consists of link 133 as welded to plate 116. A standard link on chain 128 is connected to link 133.

Angle iron 118 has a top portion 136A and a bottom portion 136B. In some embodiments, bottom portion 136B may be of larger dimension than top portion 136A for defining a larger V-channel 138 to better secure the bucket to the base.

Plate 116 is bent about its midsection thereby forming a first section 135 and a second section 137. Second section 137 is not planar with first section 135. The reason for the bend in plate 116 which results in non-planar sections 135 and 137 is many times the vehicle operator desires to tow a trailer or wagon with the bucket in its loading position. The reason for a preference of this position is that lip 60 is often nearest the ground in this position which is typically where the trailer hitch is located. This position is more clearly displayed in FIG. 8.

FIG. 8 shows a side sectional view of a bucket 152 to which hitching device 110 is attached in a loosely engaged position. Hitching device 110 includes base 112, chain assembly 114, and an alternative embodiment of a chain binder shown here as a chain binder 264. Various parts of bucket 152 are similarly numbered in accordance with similar parts on bucket 52.

Chain binder 264 includes a first hook 265, a first attachment chain 266, a connector 270 with a link receiver 271, a handle 272, a U-link 273, a connector 274, a second attachment chain 276, and a second hook 277. Handle 272 has a U-shaped end for receiving connector 270 when the handle is in a closed position, while U-link 273 is U-shaped to accomodate the rotation of handle 272.

U-link 273 is shown partially cut away to show its connection with connector 274. Connector 274 is typically an eyelet with a threaded shaft. U-link 273 has an aperture in its end for receiving the threaded shaft on connector 274. A nut is fastened on to the threaded shaft to fix connector 274 to U-link 273.

Bucket 152, as shown in FIG. 8, is rotated in comparison to the bucket shown in FIGS. 4–5 so that the bucket is shown in a standard loading position as previously discussed. The ground is approximately parallel to the front side 154 when the bucket would be in this standard fully lowered position where material such as dirt can be picked up. The open portion of the bucket would face forward away from the vehicle when in this position.

In more detail, this position results in lip 160 and first side 154 of the bucket being both generally parallel to the ground. To tow from this position, a bent plate such as base 112 which includes plate 116 would be used because the bend in the plate positions hitching device 110 such that plate 112 is generally horizontal to the ground while the ball is generally vertical from the ground. This positioning allows for easier and safer towing. Also, many trailers contain hitches that are very near the ground and therefore required the hitch to be very near the ground as is the case when the bucket is rotated into this standard loading position.

In contrast, the hitching device 10 as is shown in FIGS. 4–5, shows the hitching device where base 12 would be generally parallel to the ground if the ground were positioned under curved base 58 of the bucket. Typically this position results in the front lip of the bucket being raised from the ground due to the curved base 58.

The portable hitching device of the present invention is extremely useful as it typically can be installed in less than 10 seconds. Further, it enables utility vehicles to move all types of trailers with relative ease. For instance, as a direct result of the good visibility and maneuverability of a skid-steer loader, it becomes relatively easy for even an inexperienced skid-steer operator to back up a 4-wheeled wagon—a feat that can usually only be accomplished with highly experienced operators on other tow vehicles and, even then, with considerable difficulty.

Although the present invention has been described with reference to preferred embodiments, workers skilled in the art will recognize that changes may be made in form and detail without departing from the spirit and scope of the invention.

What is claimed is:

1. A hitching device detachably connectable to a bucket on a vehicle, the bucket having a front side and a back side, the hitching device comprising:

a mount for engaging the front side of the bucket, the mount having a connection for receiving a trailer; and a brace attached to the mount and attachable to the back side of the bucket for securing the mount to the front side of the bucket, wherein the mount is readily detachable from the brace.

2. The hitching device of claim 1 wherein the mount comprises a steel plate.

3. The hitching device of claim 1, wherein the mount comprises a groove for engaging the front side of the bucket.

4. The hitching device of claim 3 wherein the groove is v-shaped.

5. A hitching device detachably connectable to a bucket on a vehicle, the bucket having a front side and a back side, the hitching device comprising:

a mount for engaging the front side of the bucket, the mount having a connection for receiving a trailer, wherein the mount comprises an angle iron and a plate positioned to form a v-shaped groove defined by an intersection formed by a side of the plate and a side of the angle iron; and a brace attached to the mount and attachable to the back side of the bucket for securing the mount to the front side of the bucket.

6. A hitching device detachably connectable to a bucket on a vehicle, the bucket having a front side and a back side, the hitching device comprising:

a mount for engaging the front side of the bucket, the mount having a connection for receiving a trailer; and a brace attached to the mount and attachable to the back side of the bucket for securing the mount to the front side of the bucket, wherein the brace comprises a chain.

7. The hitching device of claim 6 wherein the brace further comprises a chain coupling for attaching the chain to the mount.

8. The hitching device of claim 6 wherein the brace further comprises an adjustable chain binder having a first position wherein the mount is loosely engaged to the bucket and a second position wherein the mount is securely engaged to the bucket.

9. The hitching device of claim 8 wherein the adjustable chain binder comprises a handle having an open position placing the chain binder in the first position and a closed position placing the chain binder in the second position.

10. The hitching device of claim 9 wherein the adjustable chain binder further comprises a screw for length adjustment of the binder.

11. A hitching device detachably connectable to a bucket on a vehicle, the bucket having a front side and a back side, the hitching device comprising:

a mount for engaging the front side of the bucket, the mount having a connection for receiving a trailer, wherein the connection comprises:

an aperture in the mount; and a ball hitch having a threaded stem insertable into the aperture; and a brace attached to the mount and attachable to the back side of the bucket for securing the mount to the front side of the bucket.

12. A hitching device detachably connectable to a bucket on a vehicle, the bucket having a front side and a back side, the hitching device comprising:

a mount for engaging the front side of the bucket, the mount having a connection for receiving a trailer, wherein the mount is bent; and a brace attached to the mount and attachable to the back side of the bucket for securing the mount to the front side of the bucket.

13. A hitching device detachably connectable to an implement attached to a vehicle, the attached implement having a first side and a second side, the hitching device comprising:

a mount for engaging the first side of the attached implement, the mount having a hitching connection; and a brace attached to the mount and attachable to the second side of the implement, wherein the mount is readily detachable from the brace.

14. The hitching device of claim 13, wherein the mount comprises an arm for engaging the first side of the attached implement.

15. The hitching device of claim 13 wherein the brace comprises a chain, a chain coupling, and an adjustable chain binder, the adjustable chain binder having a first position wherein the mount is loosely engaged to the attached implement and a second position wherein the mount is securely engaged to the attached implement.

16. The hitching device of claim 13 wherein the mount further comprises an aperture and wherein the hitching connection comprises a ball hitch having a threaded stem insertable into the aperture.

17. A method for hitching a trailer to a vehicle, the vehicle having an attached implement, the attached implement having a first side and a second side opposed to the first side, the method comprising:

setting a mount on the first side, the mount having a groove conforming to an edge of the first side, such that the mount is constrained from movement toward the second side;

securing a brace to the mount and to the second side such that the groove of the mount is securely engaged to the edge of the first side; and hitching a trailer to the mount.

18. The method of claim 17 wherein the hitching step further comprises the steps of:

affixing a hitching connection to the mount; and connecting a trailer hitch to the hitching connection.

19. The method of claim 17 wherein the securing step further comprises the steps of:

attaching a brace to the mount and to the second side, the brace having a first position in which the mount is loosely engaged to the edge of the first side, and a second position in which the mount is securely engaged to the edge of the first side;

switching the brace from the first position to the second position such that the mount is securely engaged to the edge of the first side.

20. The method of claim 19 wherein the attaching step further comprises the step of adjusting the length of the brace such that the brace supplies sufficient force to secure the mount when in the second setting.

* * * * *